(12) United States Patent
Chanatski

(10) Patent No.: US 9,707,988 B1
(45) Date of Patent: Jul. 18, 2017

(54) STROLLER LIGHT

(71) Applicant: Gary Frank Chanatski, Paramus, NJ (US)

(72) Inventor: Gary Frank Chanatski, Paramus, NJ (US)

( * ) Notice: Subject to any disclaimer, the term of this patent is extended or adjusted under 35 U.S.C. 154(b) by 0 days.

(21) Appl. No.: 14/756,226

(22) Filed: Aug. 20, 2015

(51) Int. Cl.
| | | |
|---|---|---|
| *F21V 21/00* | (2006.01) | |
| *F21V 7/00* | (2006.01) | |
| *B62B 9/00* | (2006.01) | |
| *B60Q 1/26* | (2006.01) | |
| *F21L 4/00* | (2006.01) | |
| *F21V 21/096* | (2006.01) | |
| *F21V 23/04* | (2006.01) | |

(52) U.S. Cl.
CPC ............ *B62B 9/005* (2013.01); *B60Q 1/2615* (2013.01); *F21L 4/00* (2013.01); *F21V 21/0965* (2013.01); *F21V 23/0407* (2013.01)

(58) Field of Classification Search
CPC ........... B62B 9/005; B60Q 1/2615; F21L 4/00
See application file for complete search history.

(56) References Cited

U.S. PATENT DOCUMENTS

| | | | | |
|---|---|---|---|---|
| 2009/0079153 | A1* | 3/2009 | Chaudeurge | ............ B62B 9/005 280/47.38 |
| 2012/0300439 | A1* | 11/2012 | Davis Hatfield | ....... B62B 9/005 362/183 |

\* cited by examiner

*Primary Examiner* — Elmito Breval
(74) *Attorney, Agent, or Firm* — Joshua Kaplan, Esq.; Kaplan Law Practice LLC

(57) ABSTRACT

This patent utilizes magnetic technology and a sliding lock mechanism to securely fasten a light to a stroller and to also remove this light from the stroller. The first magnetic base will fasten to the stroller using an adherent. The second part of the system is attached to the light. This portion will contain grooves and a connecting magnet that will slide into the base, securely attaching the light to the stroller, or another object.

15 Claims, 7 Drawing Sheets

STROLLER LIGHT

This light system is dedicated to this protection of both babies and parents by warning drivers that there is an individual pushing a carriage with a child in it both during the day, and at night. It may also be used by persons in wheelchairs or with mobility issues, such as walkers, to warn drivers of their presence.

The portable, battery operated system attaches to the mobility device and illuminates the path just in front of, and to the sides of, the mobility device.

The light's main focus, however, is to alert on coming vehicles of the presence of a person ahead of them. The light has both steady and blinking light settings that can be changed by pushing a button.

The light housing will be effective in all weather conditions.

The system is meant to allow people to walk in the streets, parking lots, parks, walkways, etc. while both casting illumination, and warning oncoming vehicles.

DESCRIPTION OF DRAWING

Figure 1:
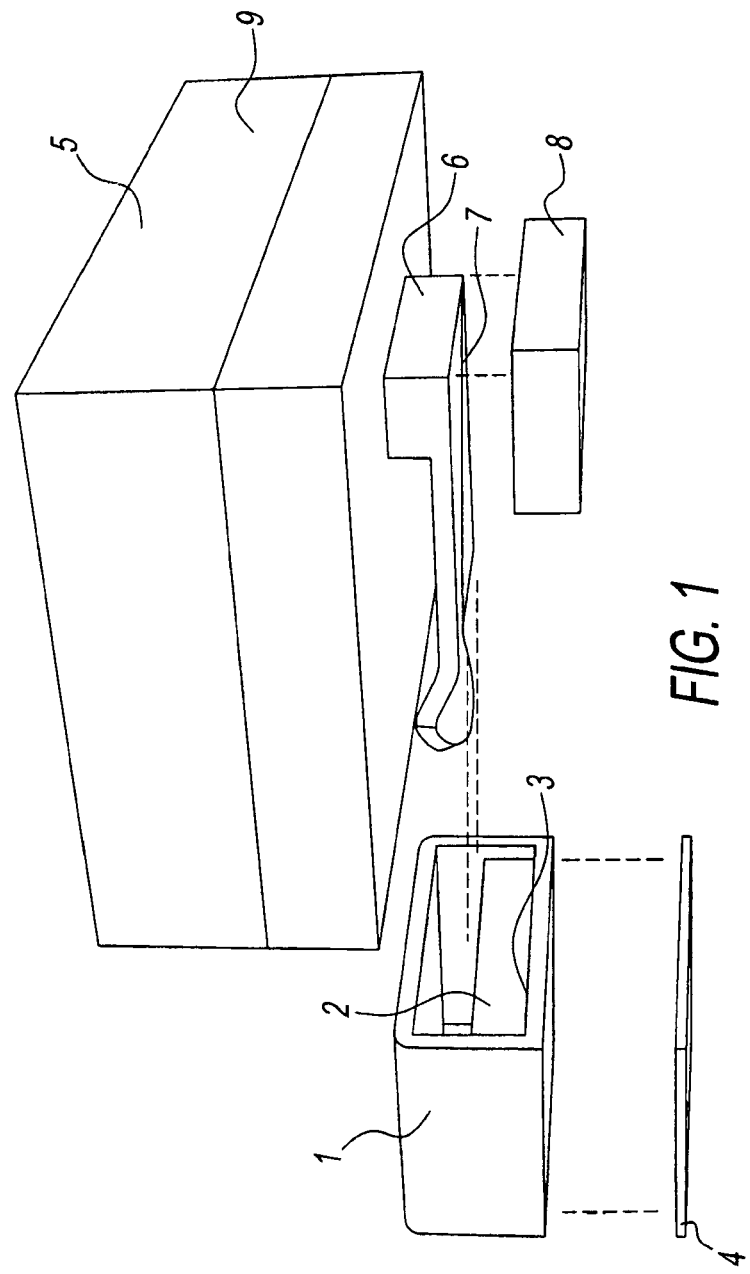
FIG. 1 is an exploded diagram demonstrating the different components of the light fixture and mount.
Figure 2:
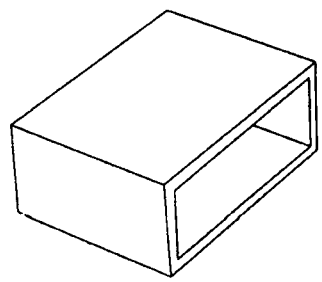
FIG. 2 is a detailed view of the casing or mount.
Figure 2:
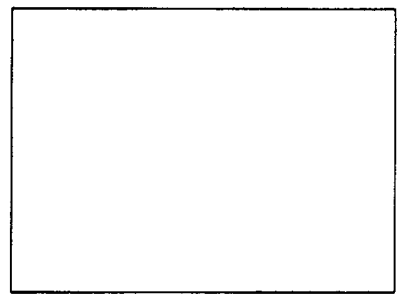
Figure 2:
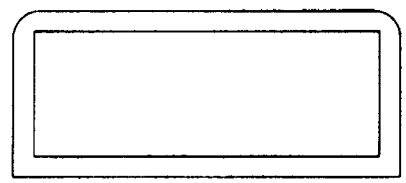
Figure 3:
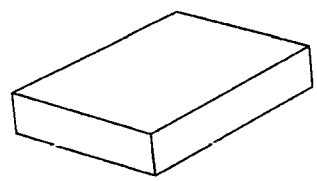
FIGS. 3 and 4 are a detailed view of the magnets.
Figure 3:
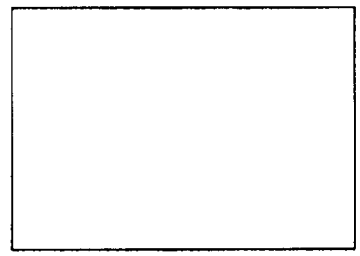
Figure 3:
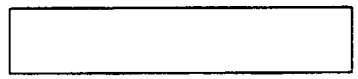
Figure 4:
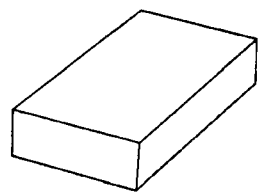
Figure 4:
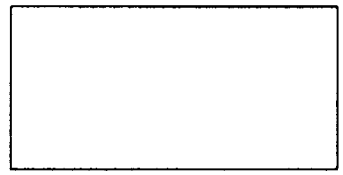
Figure 4:
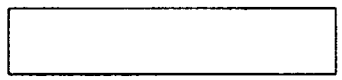
Figure 5:
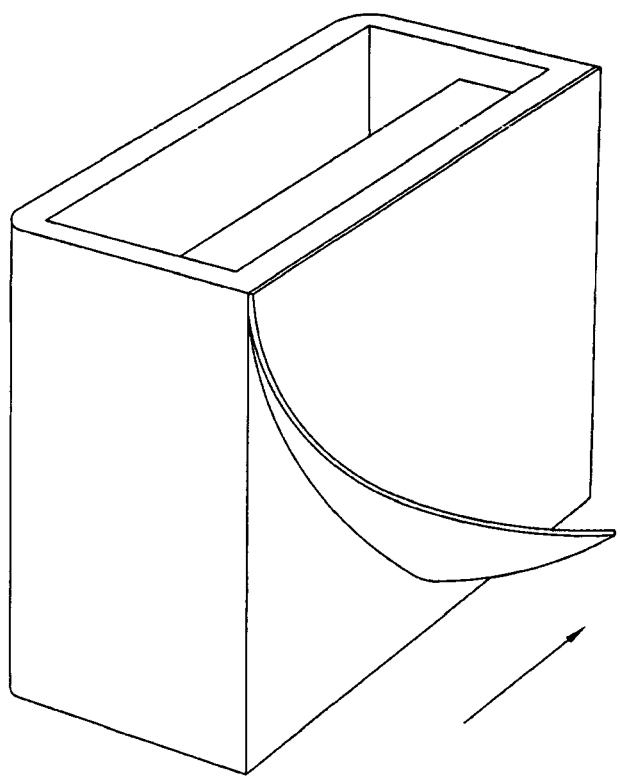
FIG. 5 is a mount showing an adhesive tape.
Figure 6:
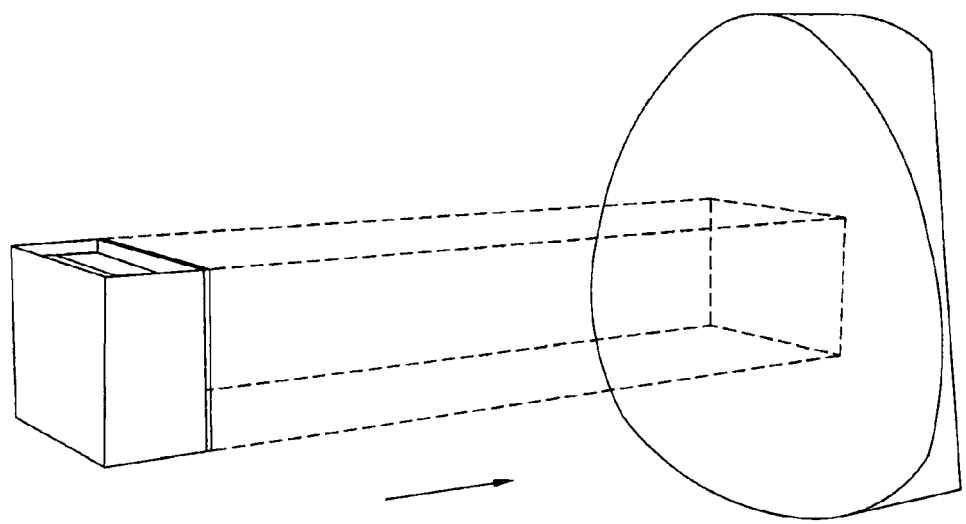
FIG. 6 demonstration of mounting the mount onto a surface.
Figure 7:
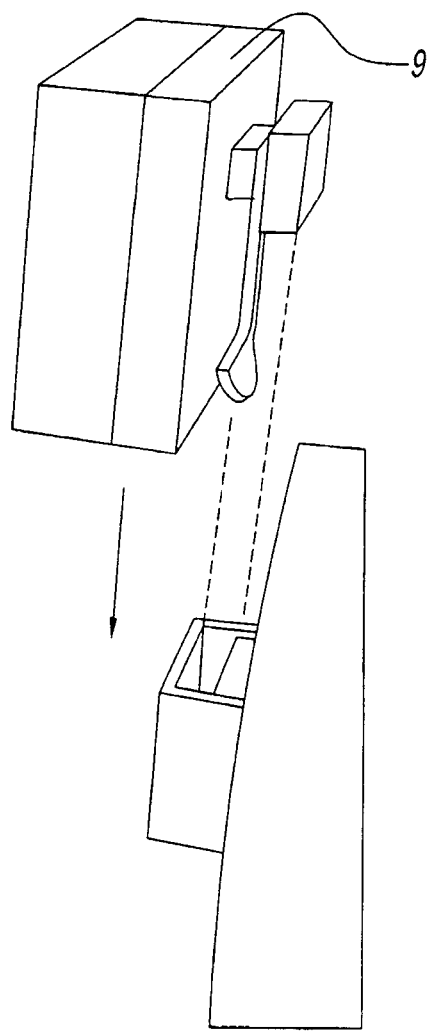
FIG. 7 demonstrates the system of assembled light fixture being inserted into a mount that is attached to a surface.

FIG. 1 Depicts a plastic casing 3 to that will be used as a mount for the system. FIG. 1 depicts a magnet 2 which will help secure and stabilize the light fixture 9 and it will be secured to the base with an adhesive (FIGS. 5 and 6). FIG. 1 depicts a separate adhesive tape 4 which will be used to mount the base 1 to a stroller, wheelchair, or other surface (FIG. 6). FIGS. 2 through 6 shall collectively be known as "the mount" 1. FIGS. 1 and 7 depict the light casing 9, and further depicts the LED lights 5 that will be used to illuminate. An adhesive will connect the plastic clip 7 depicted in FIGS. 1 and 7 which is described as a plastic slide mechanism 6 that will be fitted into the casing 3 of the mount 1. FIG. 1 further depicts a magnet 8 with an opposite polarity as the one in the base 1. FIGS. 1 and 7 shall be collectively known as "the light". When slid into place, the clip 6 and the magnets 8 and 2 shall secure the light 5 to mount 1. FIG. 2 depicts an enlargement of FIG. 1. FIGS. 2 through 6 depict enlargements of the magnets 8 and 2 along with the adhesive previously depicted in FIGS. 1 and 5. FIG. 5 depicts the entirety of the mount along with the adhesive tape use to adhere it to a surface. FIG. 6 depicts the action required to place the mount onto a surface. FIG. 7 depicts the method by which the light shall slide into the mount.

SPECIFICATIONS

1. The light system is designed to attach to the sides of a stroller, carriage, or wheelchair through magnetic force.
2. Magnets inside of a plastic housing shall be adhered to the side of the stroller, carriage, r wheelchair which will allow the opposing charge magnet connected to the light system to attach with the magnetic plate.
3. To ensure that the light does not get knocked away by a perpendicular force, the magnet connected to the device shall slip inside the housing for the magnet tape.
4. The light used will be a generic portable safety light which shall, at a minimum be waterproof, utilizing standard AA batteries.
5. Each system, when marketed, will include, at a minimum, two such lights.
6. The light operates on a steady light setting for 6 hours and for 12 hours on various flash settings. The light will switch from one setting to another by pushing a button located on top of the device.
7. The system is designed to permit strollers, wheelchairs, or anything else that the light is mounted to, to emit a beam of light for approximately three feet and can be seen for more than a straight distance of a quarter mile.

The invention claimed is:

1. A lighting system for strollers, carriages, wheelchairs and other transportation devices comprising; at least a lighting unit contained within a reflective housing; a clip attached to the light and a magnetic attachment member affixed to the clip; a base mount comprised of a casing, said casing being one unit formed from four sides, said four sides surrounding an empty center; and said base mount having a magnet, said magnet having an opposing charge from said magnetic attachment member.

2. The lighting system of claim 1, wherein the clip sliding into the base mount creating a removable seal between the mount and the light.

3. The lighting unit as claimed in claim 2, whereby the attachment of the lighting unit to the base mount further comprises at least magnets consisting of Neodymium Iron Boron (NdFeB or NIB), Samarium Cobalt (SmCo), Alnico, Ceramic or Ferrite.

4. The lighting unit as claimed in claim 2, whereby each base mount shall provide a permanent attachment to a side of the stroller.

5. The lighting unit of claim 4, wherein said permanent attachment to said stroller is accomplished with a two sided adhesive tape, wherein one side of said adhesive tape bonding to said side and an opposite side of said two sided adhesive tape bonding to said casing of said base mount.

6. The lighting system of claim 2, wherein said light unit is removable without removing said base mount.

7. The lighting system of claim 4, wherein said light unit is protected from getting detached from said stroller by a force striking perpendicularly to the orientation of said lighting unit.

8. The lighting system of claim 2, whereby the removable seal is strengthened by a removable seal created between the magnetic attachment member on the clip and the magnet on the base mount.

9. The lighting unit as claimed in claim 1, wherein said lighting unit shall contain at least one lighting element selected from the group consisting essentially of: LED's, incandescents, reflective lights, LED silicone lights and other visible lights.

10. The base of the lighting unit as claimed in claim 1, wherein said base mount shall be attachable to at least the front, middle or sides of a stroller, wheelchair or other surface.

11. The lighting system of claim 1, having at least one base mount attachable to each of the sides of the stroller.

12. The lighting unit as claimed in claim 1, said lighting unit being powered by AA batteries.

13. The lighting unit of claim 12, wherein said AA batteries being sealed inside the light unit.

14. The lighting unit of claim 12, wherein said AA batteries shall directly connect to the light via a conductor or circuit board.

15. The lighting unit as claimed in claim 1 containing red, flashing, or constant light to warn drivers or cyclists.

* * * * *